Figure 1:
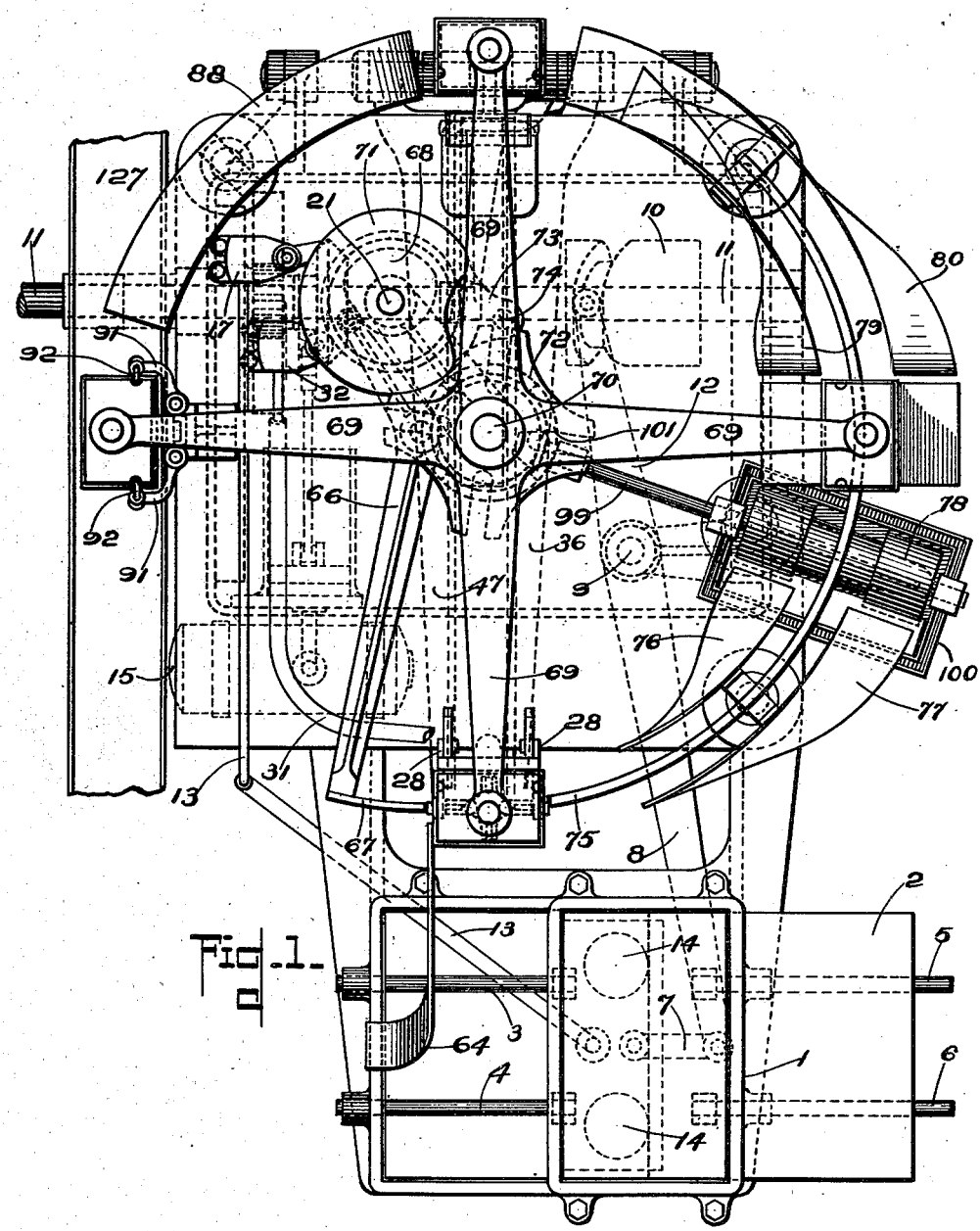

No. 736,237. PATENTED AUG. 11, 1903.
W. H. DOBLE.
MACHINE FOR SETTING UP AND FILLING CARTONS OR THE LIKE.
APPLICATION FILED FEB. 1, 1902.
NO MODEL. 8 SHEETS—SHEET 1.

Witnesses
Inventor
William H. Doble
by Wm A. Copeland
Attorney.

No. 736,237. PATENTED AUG. 11, 1903.
W. H. DOBLE.
MACHINE FOR SETTING UP AND FILLING CARTONS OR THE LIKE.
APPLICATION FILED FEB. 1, 1902.
NO MODEL. 8 SHEETS—SHEET 2.

Witnesses
Inventor:
William H. Doble

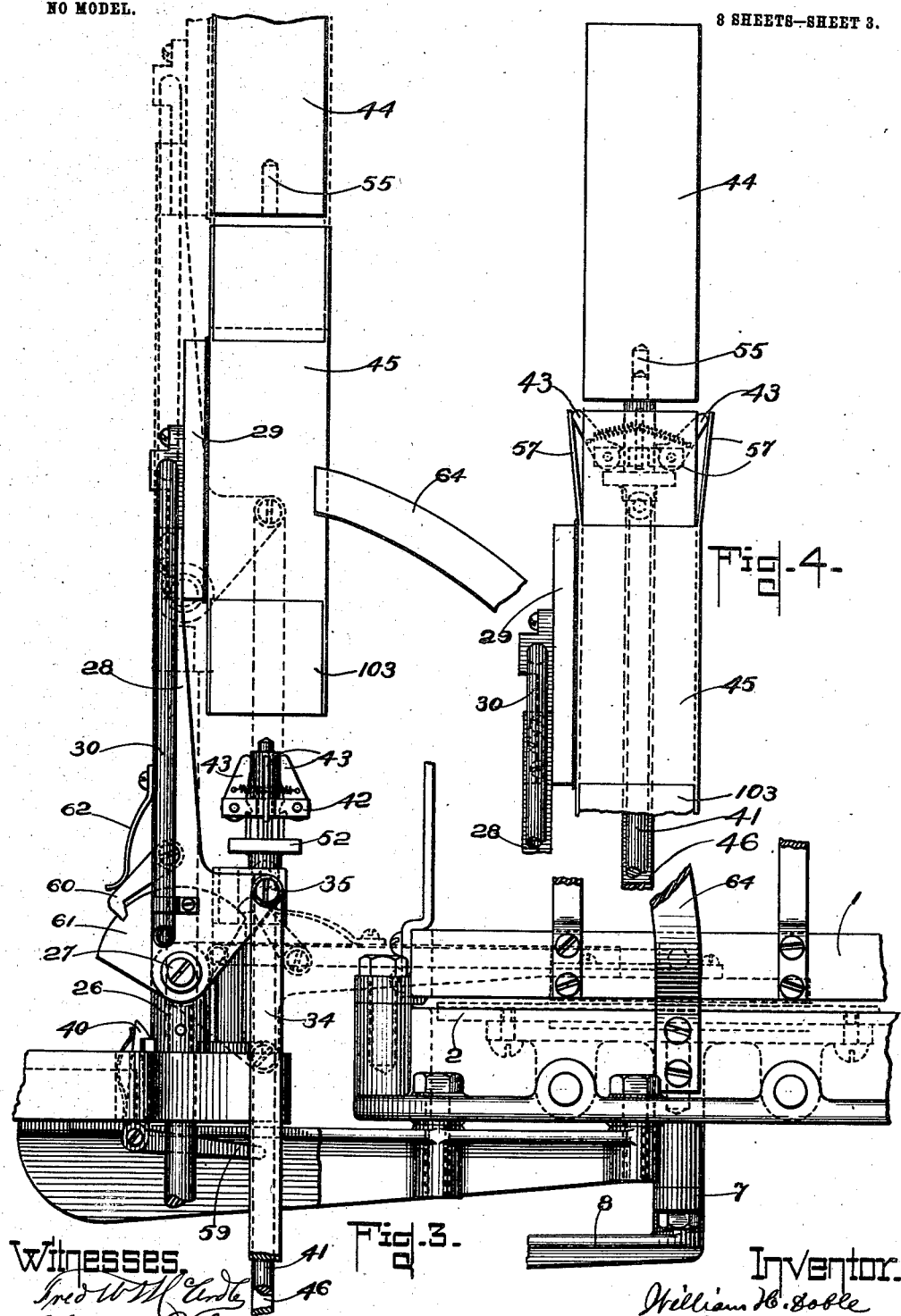

No. 736,237. PATENTED AUG. 11, 1903.
W. H. DOBLE.
MACHINE FOR SETTING UP AND FILLING CARTONS OR THE LIKE.
APPLICATION FILED FEB. 1, 1902.
NO MODEL. 9 SHEETS—SHEET 4.
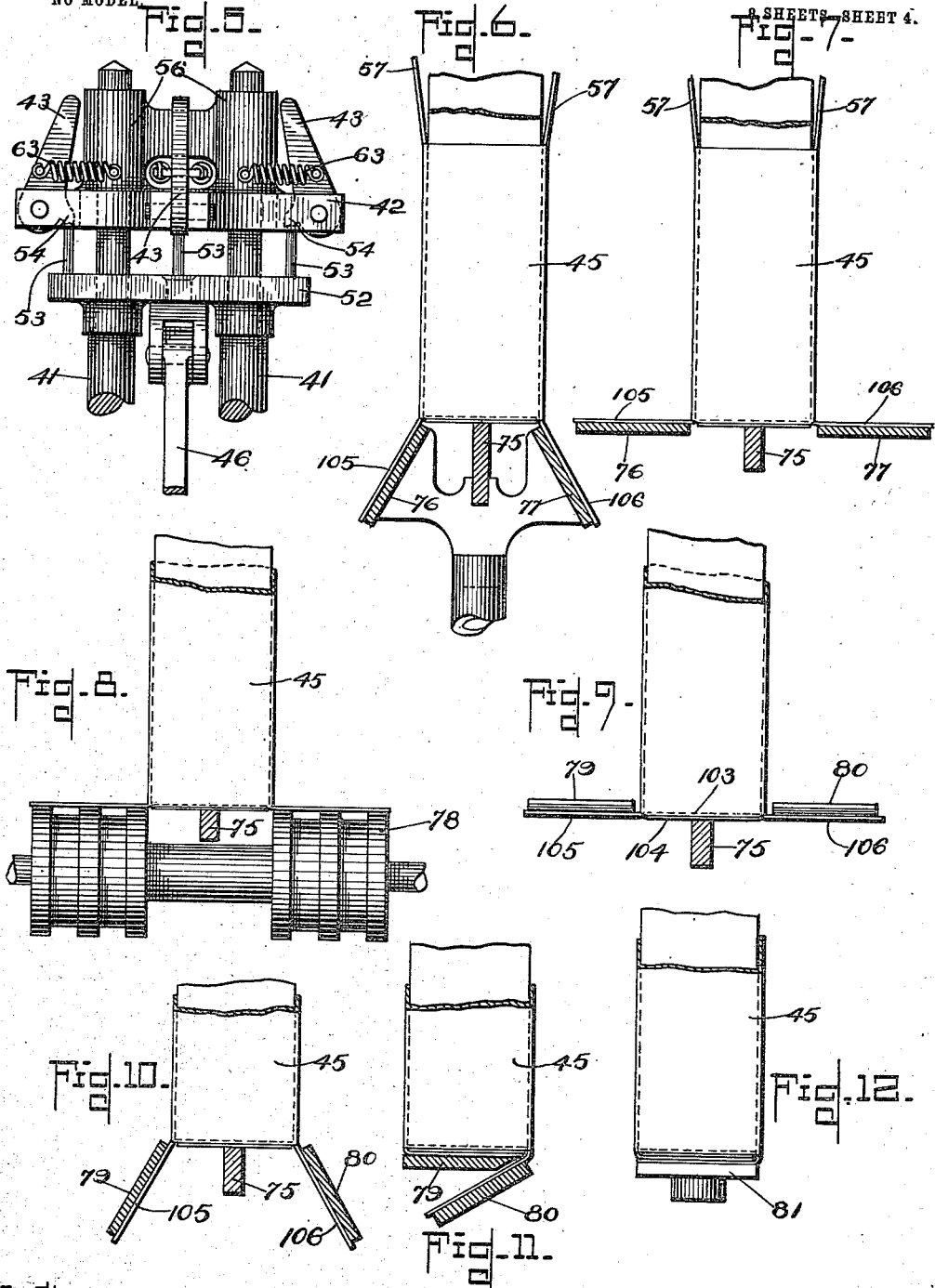
Witnesses.
Fred W. McArdle
Charles B. Crocker.
Inventor.
William H. Doble
by Wm. A. Copeland
Attorney.

No. 736,237. PATENTED AUG. 11, 1903.
W. H. DOBLE.
MACHINE FOR SETTING UP AND FILLING CARTONS OR THE LIKE.
APPLICATION FILED FEB. 1, 1902.
NO MODEL. 8 SHEETS—SHEET 5.
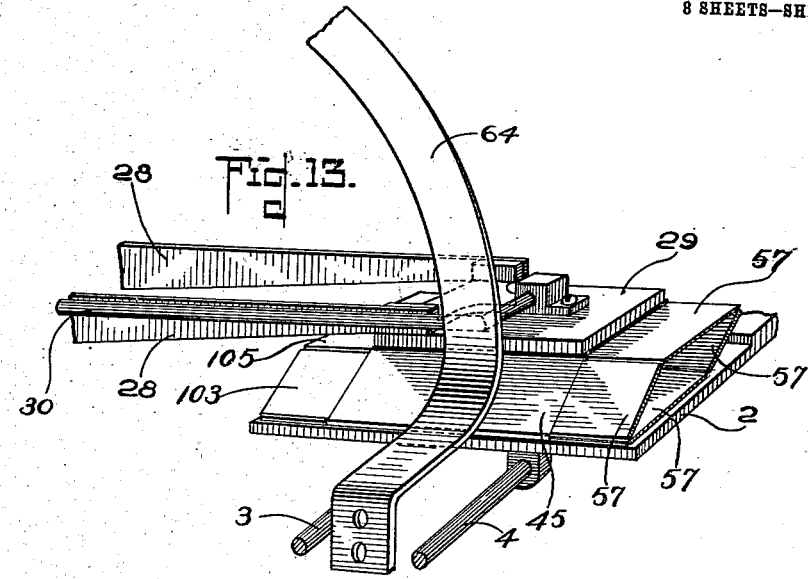
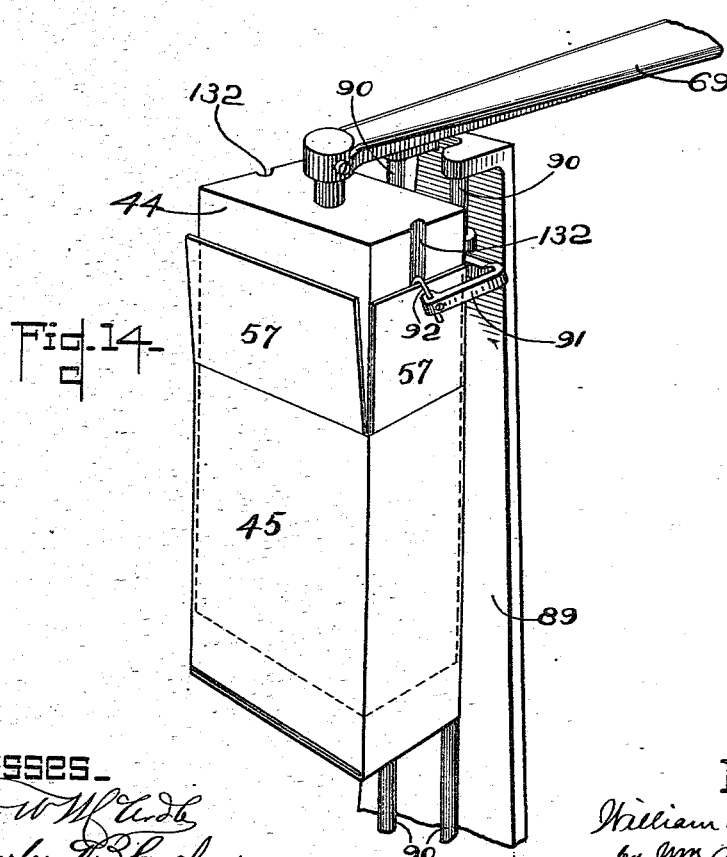

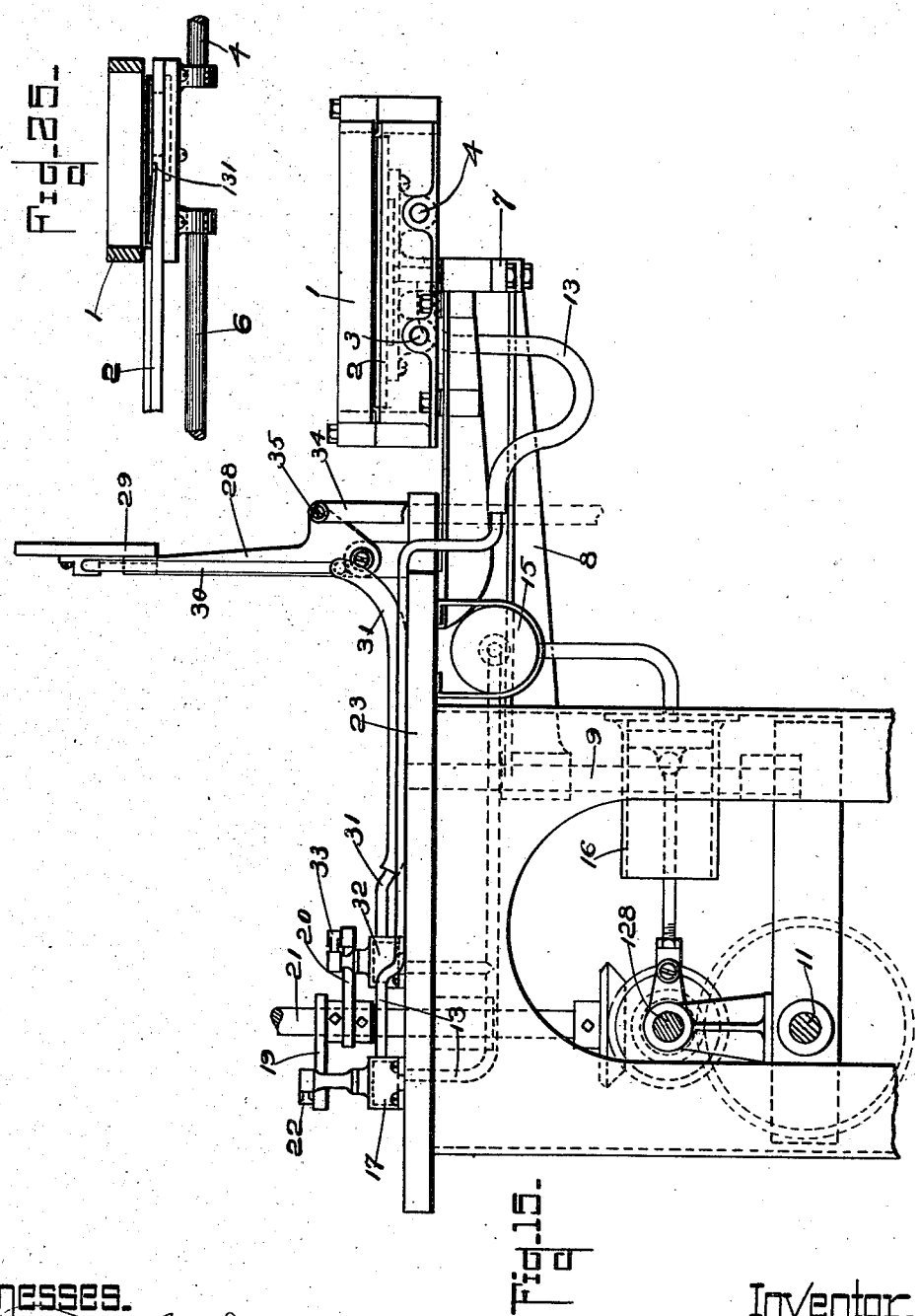

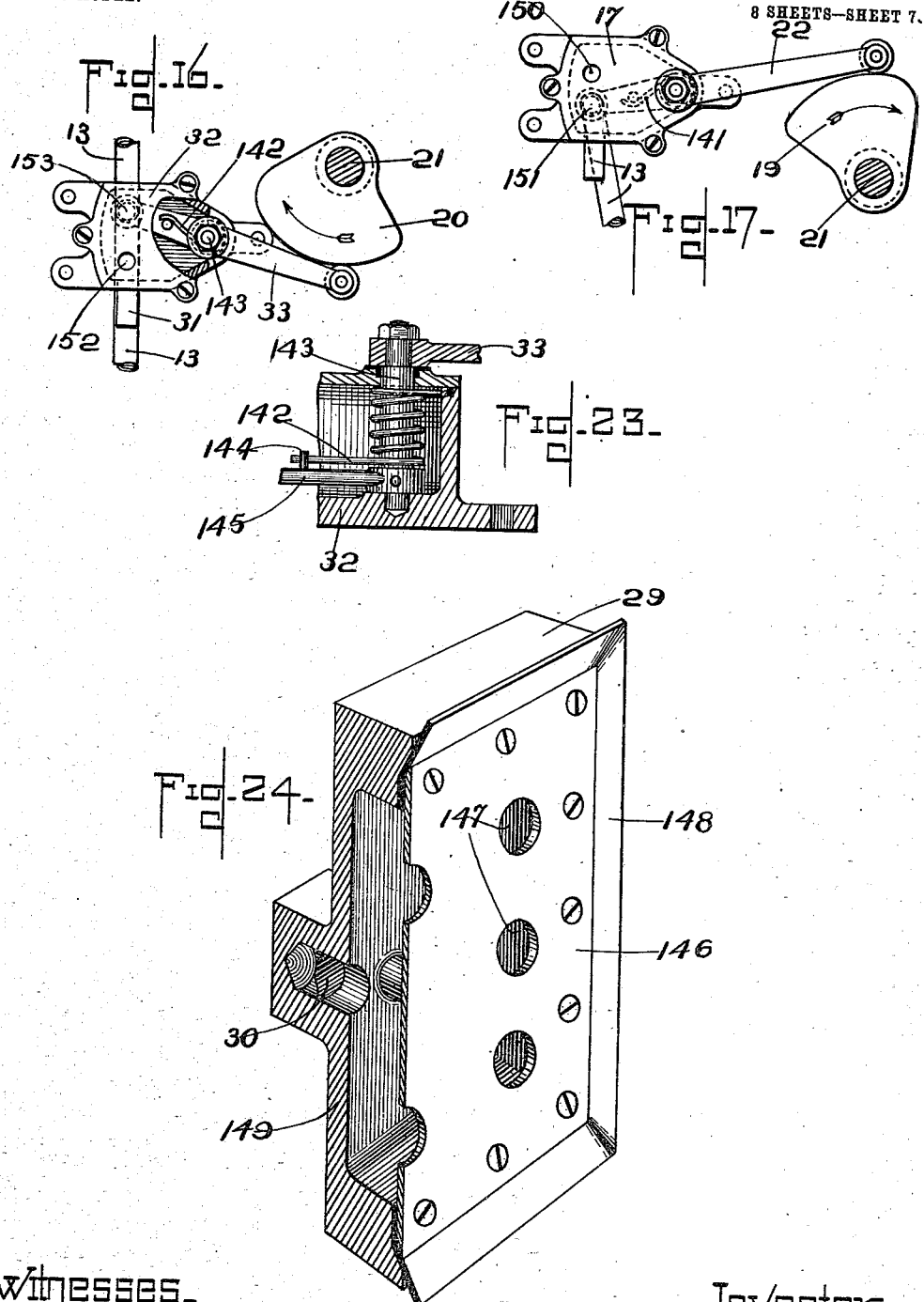

No. 736,237. PATENTED AUG. 11, 1903.
W. H. DOBLE.
MACHINE FOR SETTING UP AND FILLING CARTONS OR THE LIKE.
APPLICATION FILED FEB. 1, 1902.
NO MODEL. 9 SHEETS—SHEET 8.
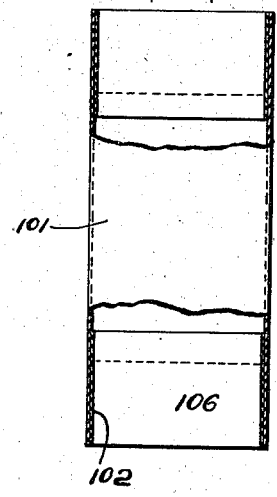
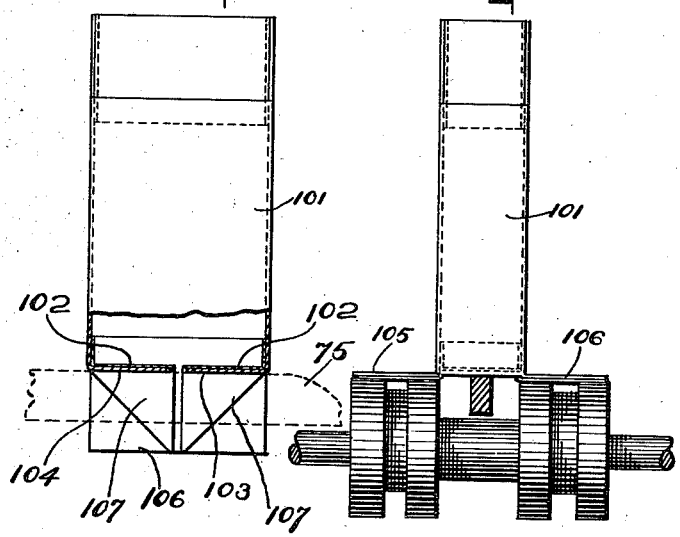
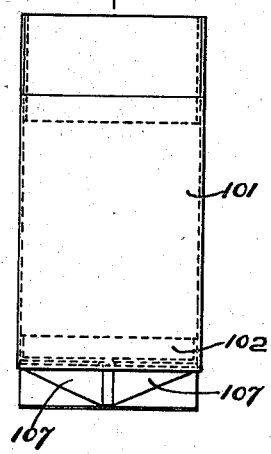
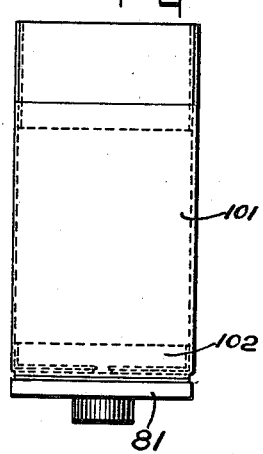
Witnesses
Inventor
William H. Doble
by Wm. A. Copeland
Attorney.

No. 736,237.

Patented August 11, 1903.

UNITED STATES PATENT OFFICE.

WILLIAM HENRY DOBLE, OF QUINCY, MASSACHUSETTS, ASSIGNOR, BY MESNE ASSIGNMENTS, TO PNEUMATIC SCALE CORPORATION, OF BOSTON, MASSACHUSETTS, A CORPORATION OF MAINE.

MACHINE FOR SETTING UP AND FILLING CARTONS OR THE LIKE.

SPECIFICATION forming part of Letters Patent No. 736,237, dated August 11, 1903.

Application filed February 1, 1902. Serial No. 92,143. (No model.)

*To all whom it may concern:*

Be it known that I, WILLIAM HENRY DOBLE, a citizen of the United States, and a resident of Quincy, in the county of Norfolk and State of Massachusetts, have invented a certain new and useful Improvement in Machines for Setting Up Cartons or the Like, of which the following is a specification.

The invention relates to a machine for setting up and filling cartons and the like.

As the cartons usually come from the manufacturer they are in a "knockdown" form—that is, the side flap is pasted and the end flaps are left unpasted, so that the carton can be laid out flat for convenience of packing and transportation.

One object of this invention is to provide a machine to take the cartons in their knockdown form and square them out and fold the ends and paste the bottom flaps.

The machine shown in the drawings as embodying the invention is especially intended to be used in combination with a packaging-machine; but the setting-up mechanism may be employed in a machine to be used independently of a packaging-machine, and the claims are not intended to be limited to the machine simply when used in such combination.

The invention will now be fully described by reference to the accompanying drawings, and the novel features thereof will be particularly pointed out in the claims at the close of the specification.

Figure 2:
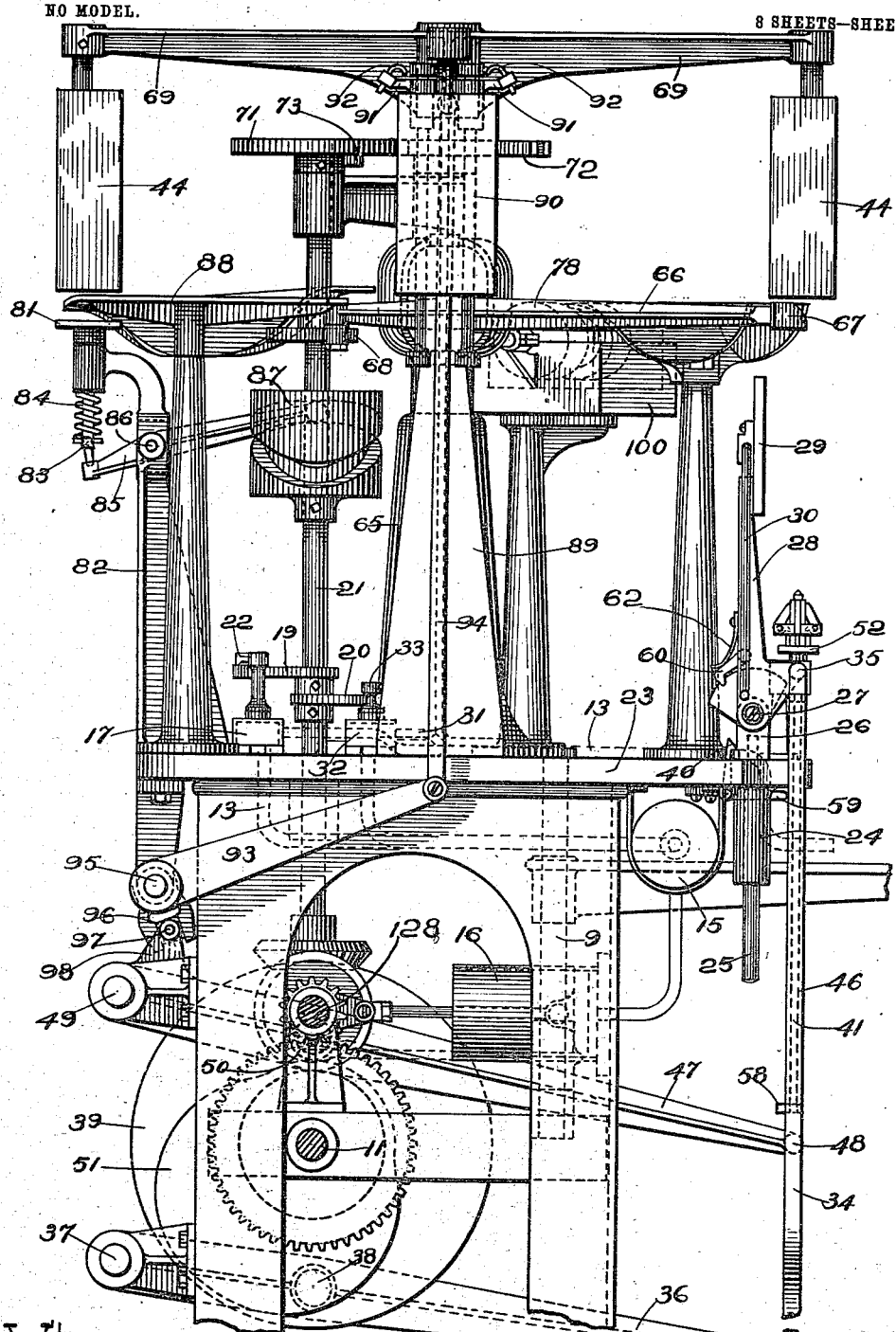

Referring now to the drawings, Figure 1 is a plan of a machine embodying the setting-up mechanism, the packaging mechanism being broken away. Fig. 2 is a side elevation viewed from the left of Fig. 1. Fig. 3 is a detail view enlarged from Fig. 2, showing the carton-lifting arm and guide-fingers and the relation of the feed mechanism. Fig. 4 is a detail of a part of Fig. 3, showing the guide-fingers in their elevated position and spread out. Fig. 5 is a detail of the guide-fingers. Fig. 6 is a detail of the guide-strips which open the side flaps of the bottom end before passing over the glue-roll; also a rail which throws up and holds one or both of the end flaps. Fig. 7 is a detail of the same guiding-strips as Fig. 6 in the position where the carton is ready to pass over the glue-roll. Fig. 8 is a detail view of the glue-roll and the carton with its flaps opened out passing over the glue-roll. Fig. 9 shows another set of guide-strips which engage the outside of the flaps and by the progressive motion of the carton close them, as shown in Figs. 10 and 11. Fig. 12 shows the carton with the four flaps which form the bottom all closed and a pressure-plate pressing them together. Fig. 13 is a perspective showing in detail the lifting-arm engaging the partially-opened carton. Fig. 14 is a perspective showing the squared-out carton partially thrown off from its forming-block by the downward movement of the throw-off fingers. Fig. 15 is an elevation showing the air-pump and connections. Figs. 16 and 17 are details of the air-valves. Figs. 18 to 22, inclusive, are detail views showing how a carton of a different construction from that shown in the preceding views may be handled or set up by the same machine. Fig. 23 is an enlarged sectional view of the valve shown in Fig. 16. Fig. 24 is a detail view, partly in section, showing the suction-plate. Fig. 25 is a sectional detail showing a depression in the face of the carrier for the extra thickness of the overlapping portions of the carton which form the seam.

The cartons in their knockdown form are stacked in a hopper 1 or other suitable receptacle, from which they are drawn out one at a time from beneath by a sliding carriage 2. Said carrier is mounted on sliding rods 3 4 5 6 and is connected by link 7 with lever 8, which is mounted on rock-shaft 9, and said shaft 9 is actuated through lever 12 by a cam 10 on driving-shaft 11. The reciprocating movement of the carriage brings out one carton at a time from the bottom of the stack, the front part of the hopper having a shallow opening at the bottom just deep enough to permit passage out of one carton at a time, the carton being engaged by a shoulder on the upper side of the carriage to eject the carton. At the same time the suction-pipe 13 acts on the under side of the carton through holes 14 in the carriage to draw the carton flat down upon the carriage and prevent its being caught by the edge of the hopper as it passes out. Said suction-pipe 13 is connected with the air-chamber 15, in which a partial vacuum is maintained by means of a suction-pump 16. In pipe 13 is two-way valve 17, which controls the admission of air to the suction end of the pipe, and suitable mechanism is provided to shut off connection with the vacuum-chamber 15 and open connection with the outside air at the proper time to relieve the suction on the lower side of the carton which has been drawn out. The mechanism for operating said valve 17 may be any suitable form. That which is shown in the drawings and which is the preferred form is as follows: On shaft 21 is a cam 19, which engages with lever 22, connected with valve 17, and turns the valve to open communication through port 150 between the outside air and the suction end of the pipe 13, which acts on the lower face of the carton. When the lever rides off the point of the cam, the lever 22 is actuated by a spring 141 to turn the valve, so as to open communication between the vacuum-chamber and the suction-pipe through port 151 and close port 150, so as to apply the suction to the lower face of the carton. The setting-up mechanism is driven by means of shaft 128.

On the side of the table 23 next to the hopper 1 are two bosses 24, one of which is behind the other in Fig. 2, through each of which there is a hole in which rods 25 slide vertically, only one of which can be seen in the drawings. On the upper end of said slide-rods is a cross-head 26, in which said slide-rods 25 are fastened. Extending horizontally through said cross-head 26 is an arbor 27. Upon the ends of said arbor are mounted the lifting-arms 28, which are fastened at their upper ends to the sucker 29. The sucker 29 may be of any suitable kind. The form shown in the drawings (see Fig. 24) consists of a recessed block 149, having on the carton-engaging side a plate 146, formed with one or more perforations 147. Around the margin of the carton-engaging side is a flexible rubber lip 148. Connected with the interior of sucker 29 is a pipe 30, which is fastened to one of the arms 28 and is connected with a flexible pipe 31, leading to the vacuum-chamber 15 through valve 32 in a manner similar to the connection of tube 13 with the vacuum-chamber. Said valve 32 is similar to valve 17 and is operated by lever 33 and cam 20 on shaft 21. Said valve 32 is provided with a spring 142, one end of which is fast to the valve-casing and the other end of which engages with a stud 144 on the arm 145, whereby when the lever 33 rides off of the point of the cam 20 the valve 32 will be turned so as to open communication between the vacuum-chamber and the sucker 29 through port 153 and close communication from the sucker 29 to the outside air through port 152. When the lever 33 rides up again onto the point of the cam, port 153, leading to the vacuum-chamber, is closed and port 152, leading to the outside air, is opened and the grip of the sucker on the carton is released.

The lifting-arms 28 are actuated by suitable mechanism to move the arms in a vertical plane through a quarter-circle from a horizontal to a vertical position and return, the operating mechanism being so timed that the lifting-arms will be brought into the horizontal position with the sucker resting upon the upper panel of the carton after the carton is withdrawn from the hopper, while the lower panel is still held by the suction device on the carriage, the valve 32 being actuated so as to cause the sucker 29 to attach itself to the carton. The suction device on the carriage is so actuated as to retain its hold upon the lower panel of the carton until the lifting-arms have raised the upper panel a short distance, so as to partially open the carton before it is engaged by the squaring device, to be hereinafter described. One form of mechanism for actuating the lifting-arms is shown in the drawings and is as follows: The lifting-arms 28 are made in form of a bell-crank lever mounted upon arbor 27, as already stated, the short arms having pivoted at their outer ends the connecting-bars 34 by pivot 35. The lower ends of the connecting-bars 34 are fastened together by a cross-bar (not shown) and pivoted to the outer end of cam-actuated lever 36. The other extremity of lever 36 is mounted upon an arbor 37, supported by the frame of the machine. Carried by the said lever 36 is a roller 38, which is engaged by a track-cam fastened to cam-plate 39 on driving-shaft 11, by which the necessary movement is given to the cross-head 26 through lever 36 and connecting-bars 34. When the parts are in the position shown in the drawings, downward movement of the connecting-bars 34 will turn the bell-crank lifting-arms 28 from the vertical to a horizontal position for the sucker 29 to engage the drawn-out carton, as shown in dotted lines in Fig. 3 and in perspective in Fig. 13. As soon as the sucker 29 has attached itself to the carton 45 through the action of the valve 32 the cam which actuates lever 36 causes the connecting-bars 34 to turn up the lifting-arms 28 and with them the sucker 29, which carries with it the carton, the cross-head 26, on which the arms 28 are pivotally mounted, being prevented from rising during such movement by the engagement of a hook-latch 40. The valve 17, which controls the suction through pipe 13 on the lower panel of the carton, is turned so as to discontinue the suction when the upper panel is partially lifted, as shown in Fig. 13.

Fastened to the frame which supports the carriage 2 and the hopper 1 is a bent guide-strip 64, which engages the side of the carton as it is being lifted from the carriage and squares it out.

Mounted upon sliding rods 41 in front of and between the lifting-arms 28 is a guide-finger block 42, upon which are pivotally mounted guide-fingers 43, (shown in detail in Fig. 5,) said fingers being for the purpose of guiding the carton 45 onto the block 44, against the lower end of which the bottom flaps of the carton are folded. As soon as the lifting-arms 28 have reached a vertical position the guide-finger block 42 is caused to rise by rod 46, which is pivoted at its lower end to lever 47 by pivot 48. The other extremity of said lever 47 is mounted upon bearings 49, attached to the frame. Carried by said lever 47, between its two extremities, is a roller 50, which engages cam 51 to actuate lever 47 and rod 46 and raise guide-finger block 42. Guide-finger block 42 is arranged to slide up and down a short distance upon the upper parts of rods 41. Below said guide-finger block 42 and rigidly secured to said rods 41 is a block 52, which serves as a cross-head, in which is pivoted the upper end of rod 46. On the upper face of said block 52 are four studs 53, one for each guide-finger, which engage lugs 54 on said fingers. When the slide-rods 41 rise, the guide-fingers and slide-rods are carried up through the carton, the wedge formed by the closed fingers, as shown in Figs. 3 and 5, enabling them to enter and pass through the carton without catching. When said slide-rods 41 rise to their highest position, their pointed ends have entered holes 55 in block 44, which is at this time in line above it at a state of rest. Just before the rods 41 reach their highest position the upper ends of bosses 56 on block 42 press against the lower end of block 44 and are prevented from rising, while the continued upward motion of the slide-rods 41 and cross-head 52, which is rigidly attached to said rods and carrying studs 53, cause the fingers 43 by the pressure of the studs 53 against the lugs 54 to spread open the flaps 57 at the upper end of the carton, as shown in Fig. 4, and prevent the ends of said flaps 57 from engaging the lower end of the block 44. Toward the end of the upward movement of the guide-fingers 43 a trip-finger 58 engages the tail 59 of latch 40 and throws it out of engagement with the cross-head 26. After the fingers 43 are spread and the latch 40 is disengaged from the cross-head 26 the lever 36 carries upward the lifting-arms 28 and sucker 29 and its attached carton 45, slipping the carton onto the block 44, the lifting-arms 28 being prevented from turning beyond a vertical position by a pawl 60 engaging in a notch in a segment-plate 61, which is rigidly attached to cross-head 26. On the back of said pawl presses a spring 62. As soon as the upper end of the flaps on the upper end of the carton have risen sufficiently to prevent their catching against the lower end of the block 44 the slide-rods 41 begin to descend, and the guide-fingers 43 are closed by means of the springs 63, thus permitting the carton to be carried up onto the block free from engagement of the fingers 43 against the inside of the carton. The carton is pushed up on the block 44 far enough for the lower end of the body to be even with the lower end of the block, with the flaps hanging down below the block. As soon as it has reached that position means are employed for gluing one or more of the flaps which form the bottom and for turning them all in and pressing them up against the bottom of the block to form the bottom. One means for accomplishing these objects is shown in the drawings and will now be described.

Pivoted in the column 65 is a lever 66, having at its outer end a finger 67 and engaging at its other end a cam 68 on shaft 21. As soon as the carton is in place on the block 44, as above mentioned, the cam 68 on the continuously-rotating shaft 21 moves lever 66, so that the finger 67 pushes in one of the bottom flaps 103. At this time the suction is released from the sucker 29 and the lifting-arms 28 begin to descend, the carton being prevented from falling off by the finger 67. As soon as the lifting-arms have descended far enough for the sucker 29 to clear the block 44 the spider-arm 69, to which the block 44 is attached, is given a turn through a quarter-circle. The block-carrying spider consists of a plurality of arms 69, radiating from shaft 70, on which they are carried, each of which arms carries a block 44. As shown in the drawings, the spider has four arms; but the exact number is not material. The shaft 70 has an intermittent motion, turning at each period of movement through an arc sufficient to bring the blocks 44 in successive rotation into position to receive a new carton from the lifting-arms. The means shown for giving the intermittent movement to shaft 70 is as follows: Mounted on shaft 21 is a spur locking-disk 71, which engages a slotted disk 72 beneath the spider on shaft 70. Fastened to locking-disk 71 is a spur 73, which carries a pin 74, which engages one of the slots in disk 72. By means of this intermittent-motion device the spider is given a motion through an arc of ninety degrees and is held in its position until it is again moved by engagement of the spur 73 with another slot in the disk 72. As soon as the spider begins to move the flap 104 opposite to the one which is pushed in by the finger 67 (it being the one which is foremost in the direction that the block moves) encounters the end of a rail 75 and is thrown up against the flap which has already been folded, and at the same time the first-folded flap rides off of the finger 67, but is prevented from dropping by the second flap, or in case the flaps are not long enough to overlap each other the rail 75 will prevent it from dropping. The two side flaps 105 106 in the forward motion of the block are engaged by two guide-plates 76 77, (shown in detail in Figs. 6 and 7,) which spread them out to a horizontal position to pass over a glue-roll 78, as shown in detail in Fig. 8. After the carton passes the glue-roll the unglued faces of the side flaps are engaged by the guide-plates 79 80, the flap 105, which is engaged by guide-plate 79, being first turned up, and then the flap 106, which is engaged by plate 80, is turned up against the one turned up by plate 79. (See Figs. 9, 10, and 11.) After the flaps are all turned up the block 44, still carrying the carton, brings it to a press 81, where the flaps are pressed against the bottom of the block, the interval of rest between the periods of movement of the spider being sufficient to allow the pressure to be somewhat prolonged.

The pressure device is as follows: Supported by a standard 82, which is mounted on table 23, is a presser-plate 81, having a stem 83, which is held by spring 84 against lever 85. Said lever 85 is pivotally mounted at 86 in standard 82, and at its longer end is actuated by cam 87 on shaft 21 to give motion to the presser-plate 81. At the next movement of the spider after the flaps have been pressed the carton is preferably slid along on a table 88, so as to positively hold the flaps for a little longer period; but this feature is not essential to the invention. The preferred mechanism for removing the carton is as follows: A column 89 supports two guide-rods 90. (Shown in perspective in Fig. 14.) Sliding on said rods 90 is a throw-off-finger block 91, carrying the hook-shaped throw-off fingers 92. Formed in the sides of the block 44 are grooves 132 to accommodate the throw-off fingers. The throw-off-finger block 91 is connected by rod 94 with lever 93, which is mounted on rock-shaft 95. There is also mounted on said rock-shaft 95 a forked lever 96, which engages a roll 97, carried on a lug 98, which is on lever 47, so that the upward motion of lever 47 in moving the guide-fingers 43 up to the block 44 also operates to carry down the throw-off-finger block 91 and discharge the carton. The normal position of the throw-off fingers is up, as in Fig. 2, during the movement of the spider. In Fig. 14 the throw-off-finger block is shown part way down.

The glue-roll 78 is mounted on a shaft 99 and revolves in a glue-pan 100, the shaft 99 being revolved by shaft 70, with which it is connected by bevel-gears 101. (Shown in dotted lines in Fig. 1.) The glue-roll therefore revolves intermittently in unison with shaft 70 and spider-arms 69 and at a speed constant relative to them.

While this machine is adapted to set up cartons of the ordinary kind, such as shown in Figs. 6 to 12, it is especially adapted also to set up cartons of the kind shown in Figs. 18 to 22, which cannot be so well done by the machine shown in the Patent No. 633,953, dated September 26, 1899, to Doble and Scales. In the carton 101 (shown in Figs. 18 to 22) there is a tubular lining, of paper or other flexible material, 102, pasted inside of the body of the carton and extending outwardly with the carton-flaps, so that when the carton-flaps are folded the lining 102 will be folded inside of the flaps. When the end flaps 103 and 104 are folded, the paper lining 102 will be folded in with it, as shown in Fig. 19, leaving triangular-shaped flaps 107 still projecting and nearly flat with the side flaps 105 106. It is desirable that these triangular lining-flaps 107 shall receive glue, as well as that portion of the side flaps 105 106 which is not covered by the lining. When the side flaps 105 106 ride over the glue-roll, as shown in Fig. 20, the lining-flaps 107 will also ride over the glue-roll and receive their proportion of the glue. When the side flaps 105 106 are turned under, the lining-flaps connected therewith will also be turned in with them. For this class of cartons in order to prevent the lining from being caught by the corners of the block 44 while the carton is being slipped onto the block it is preferable to chamfer off the corners of the block at the lower end.

In the face of the carrier 2 there is preferably formed a depression 131 to allow for the extra thickness of the carton where the panels overlap to form the seam. (See Fig. 25.)

While the means shown for attaching the carton to the lifting-arms 28 is a suction device, it is not intended to limit the claims to such means only. Any suitable means by which the carton may be attached to the lifting-arms and held until time to be released may be employed and come within the scope of the invention.

The word "carton" as used in the specification and claims is intended to broadly include any kind of receptacle to which the invention may be applied, whether made of pasteboard, paper, or other material.

What I claim is—

1. In a carton-setting-up machine, a rotatable head, forming-blocks depending vertically from said head, mechanism for folding the flaps of the carton and a vertically-reciprocating pressure device which presses the folded flaps against the end of the forming-block.

2. In a carton-setting-up machine, a rotatable head, forming-blocks depending vertically from said head, mechanism which coöperates with the forming-blocks to fold the flaps during the rotation of the head, and a vertically-reciprocating pressure device which presses the folded flaps against the end of the forming-block.

3. In a carton-setting-up machine, a rotatable head, forming-blocks depending vertically from said head, and a pressure device which engages the folded end flaps and presses them against the forming-block.

4. In a machine for setting up knocked-down cartons, a block, flap-engaging fingers which form a wedge to guide the carton onto the block, and mechanism which moves said fingers to form a reversely-pointed wedge while the fingers and carton are being separated, substantially as described.

5. In a machine for setting up knocked-down cartons, a reciprocating member having pivoted thereto fingers which are normally closed, mechanism for bringing the cartons into the line of reciprocation of said member, mechanism which moves said reciprocating member so as to cause the said fingers to enter and pass through the body of the carton, a block, mechanism which causes said fingers to engage the end flaps and permit the carton to be slipped over the block, and mechanism for sliding the opened-out carton onto the block, substantially as described.

6. In a machine for setting up knocked-down cartons, a block, mechanism for slipping the cartons onto the block, flap-engaging fingers, and mechanism which causes the said fingers to engage and hold open the flaps at the forward end of the carton while the forward end is moving onto the block, substantially as described.

7. In a machine for setting up knocked-down cartons, mechanism for opening out the body of the carton, a block, mechanism for slipping the carton onto the block, flap-engaging fingers, and mechanism which causes the said fingers to engage and hold open the flaps at the forward end of the carton while the carton is being started onto the block, substantially as described.

8. In a machine for setting up knocked-down cartons, a pivoted lifting-arm, mechanism which presents a carton to be engaged by the lifting-arm, mechanisms which cause the lifting-arm to turn on its pivot and lift the carton, mechanism which opens the body of the carton, a block, a reciprocating head to which said lifting-arm is pivoted, a reciprocating member carrying flap-engaging fingers, mechanism which after the lifting-arm is turned up on its pivot moves the flap-engaging fingers through the carton toward the block, mechanism which spreads the said fingers, mechanism which raises the lifting-arm and slips the carton onto the block, said fingers holding the flaps open while the carton is being started onto the block, substantially as described.

9. In a carton-setting-up machine, a carton-feeding device, means for opening the cartons, a block, mechanism for guiding the carton onto said block, and mechanism for spreading the flaps of the carton beyond the side lines of the block while the carton is being guided onto the block, substantially as described.

10. In a machine for setting up knocked-down cartons, a reciprocating member having mounted thereon a slide-block in which are pivoted flap-spreading fingers, studs on said reciprocating member which engage said fingers and support the said block during its upward movement, mechanism for opening out a carton, a forming-block, a slot in said block into which said reciprocating member enters before the finger-block engages with said forming-block, a projection on the finger-block which after the reciprocating member has entered the forming-block engages with the forming-block and causes the said studs to open the fingers and thereby to spread the flaps, and mechanism for slipping the carton onto the forming-block, substantially as described.

11. In a machine for setting up knocked-down cartons, a pivoted carrying-arm, mechanism which attaches a carton to said arm, mechanism which causes said arm with attached carton to turn on its pivot, mechanism which opens the body of the carton, a block, mechanism which moves said pivoted arm after it has turned on its pivot so that the carton will be slipped onto the block, and flap-engaging fingers which engage the forward flaps and prevent them from obstructing the passage of the carton onto the block, substantially as described.

12. In a machine for setting up knocked-down cartons, a pivoted carton-carrying arm, mechanism which attaches a carton to said arm, mechanism which causes said arm with attached carton to turn on its pivot, mechanism which opens the body of the carton, a press-block, mechanism which moves the said pivoted arm after it has turned on its pivot so that the carton will be slipped onto the block, flap-engaging fingers which engage the forward flaps and prevent them from obstructing the passage of the carton onto the block, a detent for holding the pivoted arm so that it will turn on its pivot, and mechanism which trips the detent after the flap-fingers have engaged the flaps, substantially as described.

13. In a machine for setting up knocked-down cartons, a pivoted carton-carrying arm, mechanism for attaching a carton to said arm, mechanism for turning said arm on its pivot, mechanism for opening the body of the carton, mechanism for reciprocating the said pivoted arm in a straight line after it has turned on its pivot, a detent which prevents said arm from rising while turning on its pivot, and mechanism for releasing the detent after it has turned on its pivot, substantially as described.

14. In a machine for setting up knocked-down cartons, a carton-carrying device having a motion describing a segment of a circle, and having a supplemental motion in a straight line, combined with a block in the path of movement of the held carton whereby the carton will be placed upon said block by the supplemental movement of said carrying device, substantially as described.

15. In a carton-setting-up machine, a block, means for placing the opened-up carton upon said block, mechanism whereby the flaps are opened outwardly to be glued, flap-gluing mechanism, and mechanism which closes said flaps after being glued, substantially as described.

16. In a carton-setting-up machine, a holder for the cartons, a reciprocating carrier for withdrawing the cartons one at a time, said carrier having in its face a depression to allow for the extra thickness of the carton at the overlapping portions which form the seam, substantially as described.

17. In a machine for setting up knocked-down cartons, a carrier, a pivoted lifting-arm which attaches itself to a carton and lifts it from the carrier, and a guide which is engaged by the carton as it is being lifted and squares out the body of the carton, substantially as described.

18. In a machine for setting up knocked-down cartons, a carrier, a pivoted lifting-arm which attaches itself to a carton and lifts it from the carrier, a cam-guide which projects into the path of movement of the rising carton and engages one side of the carton, substantially as described.

19. In a machine for setting up knocked-down cartons, a pivoted carrying-arm, mechanism which causes said arm to turn on its pivot, a block, mechanism which moves said pivoted arm after it has turned on its pivot so that the carton will be slipped onto the block, and flap-engaging fingers which engage the forward flaps and prevent them from obstructing the passage of the carton onto the block, substantially as described.

20. In a carton-setting-up machine, a forming-block, a carton-carrier, mechanism which opens out the carton, mechanism which actuates the carrier to move the opened carton to the forming-block, mechanism which places the carton on the forming-block, and mechanism which folds the flaps while the carton is on the forming-block, substantially as described.

21. In a carton-setting-up machine, a forming-block, a carrier for the opened-out cartons, means for holding the carton open while on the carrier, mechanism which moves the held carton into alinement with the forming-block, mechanism which after the carton is in alinement with the forming-block moves it toward the forming-block, and mechanism which transfers the carton from the carrier onto the forming-block, substantially as described.

22. In a carton-setting-up machine, a forming-block, a carton-carrier, mechanism for opening out the carton, mechanism for retaining the carton in its opened form while on the carrier, mechanism which actuates the carrier to move the carton toward the forming-block, and mechanism which places the carton on the forming-block, substantially as described.

23. In a carton-setting-up machine, a forming-block, a carrier for the opened-out cartons, mechanism for holding the carton open while on the carrier, and mechanism which moves the carton into alinement with the forming-block, substantially as described.

24. In a carton-setting-up machine, a forming-block, a carrier for the opened-out cartons, mechanism for holding the carton open while on the carrier, mechanism which moves the held carton into alinement with the forming-block, and mechanism which transfers the carton onto the forming-block, substantially as described.

25. In a carton-setting-up machine, a forming-block, a carrier which moves the carton to the forming-block, flap-spreaders, and mechanism which engages with the forming-block and is thereby actuated to open the spreaders inside of the carton and spread the carton, substantially as described.

26. In a carton-setting-up machine, a forming-block, a carrier for the opened-out carton, an oscillating holder for said carton-carrier, mechanism for turning said holder on its pivot to bring the held carton into alinement with the forming-block, mechanism which lifts the holder and carrier and moves the carton in a straight line toward the forming-block when in such alinement, and mechanism for slipping the carton onto the forming-block, substantially as described.

27. In a carton-setting-up machine, a forming-block, an oscillating carton-carrier, mechanism for turning the oscillating carrier to bring the carton into alinement with the forming-block, mechanism which lifts the carrier and moves the carton in a straight line toward the forming-block when in such alinement, mechanism for slipping the carton onto the forming-block, mechanism which causes the descent of the carrier, and mechanism which after its descent turns it back on its pivot, substantially as described.

28. In a carton-setting-up machine, an oscillatory and slidable carton-carrier, mechanism for turning said carrier through its arc of oscillation, then moving it in a straight line, then retracting it in a straight line and turning it back through its arc of oscillation, subtantially as described.

In testimony whereof I have affixed my signature in presence of two witnesses.

WILLIAM HENRY DOBLE.

Witnesses:
WILLIAM A. COPELAND,
ROBERT WALLACE.